United States Patent [19]
Sorensen et al.

[11] Patent Number: 5,865,023
[45] Date of Patent: Feb. 2, 1999

[54] GASIFICATION COMBINED CYCLE POWER GENERATION PROCESS WITH HEAT-INTEGRATED CHEMICAL PRODUCTION

[75] Inventors: James Christian Sorensen, Allentown; Eric William Scharpf, Perkasie, both of Pa.

[73] Assignee: Air Products and Chemicals, Inc., Allentown, Pa.

[21] Appl. No.: 909,565

[22] Filed: Aug. 12, 1997

Related U.S. Application Data

[62] Division of Ser. No. 259,649, Jun. 14, 1994, Pat. No. 5,666,800.

[51] Int. Cl.$^6$ .................................. F02G 3/00; F02C 3/20
[52] U.S. Cl. .................... 60/39.02; 60/39.05; 60/39.463; 60/39.53; 60/39.59; 60/39.12
[58] Field of Search .................... 60/39.02, 39.05, 60/39.07, 39.12, 39.463, 39.53, 39.59

[56] References Cited

U.S. PATENT DOCUMENTS

| | | | |
|---|---|---|---|
| 3,788,066 | 1/1974 | Nebgen | 60/39.05 |
| 3,796,045 | 3/1974 | Foster-Pegg | 60/39.02 |
| 3,877,218 | 4/1975 | Nebgen | 60/39.05 |
| 4,273,743 | 6/1981 | Barber | 422/148 |
| 4,277,416 | 7/1981 | Grant | 518/793 |
| 4,424,667 | 1/1984 | Fanning | 60/39 |
| 4,590,760 | 5/1986 | Goebel et al. | 60/39.12 |
| 4,608,818 | 9/1986 | Goebel et al. | 60/39.12 |
| 4,631,915 | 12/1986 | Frewer et al. | 60/39.12 |
| 4,663,931 | 5/1987 | Schiffers et al. | 60/39.07 |
| 4,665,688 | 5/1987 | Schiffers et al. | 60/39.07 |
| 4,676,063 | 6/1987 | Goebel et al. | 60/39.07 |
| 4,722,190 | 2/1988 | Yamamoto et al. | 60/648 |
| 5,179,129 | 1/1993 | Studer | 518/700 |
| 5,251,433 | 10/1993 | Wallace | 60/39.05 |
| 5,295,351 | 3/1994 | Rathbone | 60/39.05 |
| 5,319,924 | 6/1994 | Wallace et al. | 60/39.02 |
| 5,388,395 | 2/1995 | Scharpf et al. | 60/39.02 |
| 5,394,686 | 3/1995 | Child et al. | 60/39.02 |
| 5,406,786 | 4/1995 | Scharpf et al. | 60/39.05 |
| 5,421,166 | 6/1995 | Allam et al. | 62/649 |
| 5,582,029 | 12/1996 | Occhiallini et al. | 62/648 |
| 5,722,259 | 3/1998 | Sorenson et al. | 60/39.12 |

FOREIGN PATENT DOCUMENTS

| | | | |
|---|---|---|---|
| 853010 | 4/1985 | Saudi Arabia . | |
| 2075124 | 11/1981 | United Kingdom | F02C 3/28 |

*Primary Examiner*—Charles G. Freay
*Attorney, Agent, or Firm*—John M. Fernbacher

[57] ABSTRACT

A method for improving the efficiency of a gasification combined cycle system for the coproduction of electric power and one or more chemical or liquid fuel products from a synthesis gas feed containing hydrogen and carbon monoxide. Waste heat is recovered from the chemical reaction system in the form of heated water which is used to heat and humidify one or more gas streams introduced into the combustor of the combined cycle system gas turbine. Waste refrigeration recovered from the synthesis gas purification system optionally is used to cool the air inlet to the gas turbine compressor.

17 Claims, 4 Drawing Sheets

GASIFICATION COMBINED CYCLE POWER GENERATION PROCESS WITH HEAT-INTEGRATED CHEMICAL PRODUCTION

This is a division of application Ser. No. 08/259,649 filed Jun. 14, 1994 now U.S. Pat. No. 5,666,800.

FIELD OF THE INVENTION

This invention pertains to the coproduction of power and chemical or liquid fuel products from synthesis gas in a gasification combined cycle system.

BACKGROUND OF THE INVENTION

Electric power is generated efficiently in gasification combined cycle (GCC) systems in which coal or other carbonaceous material is gasified using oxygen to provide synthesis gas containing the combustible components hydrogen and carbon monoxide. The synthesis gas, which also contains carbon dioxide and in some cases methane, is fired as fuel to a gas turbine system which drives a generator to produce electric power. Hot turbine exhaust is passed to a heat recovery system to produce high pressure steam which is expanded through a steam turbine to drive another electric generator to produce additional power. Such gasification combined cycle systems generate electricity in an efficient and environmentally sound manner.

The production of chemicals or liquid fuels from a portion of the synthesis gas in a gasification combined cycle system is well known and has the advantages of common operating facilities and economy of scale in the coproduction of electric power and chemicals. Several references in the background art describe existing technology for combined chemical plant/GCC power plant operations.

U.S. Pat. No. 5,179,129 describes the integration of a multi-stage liquid phase methanol plant with a standard GCC system. Excess heat of reaction from the methanol reactor is used to heat compressed synthesis gas reactor feed and boiler feed water, or to generate steam for the generation of additional electric power. U.S. Pat. No. 4,946,477 describes a liquid phase methanol/GCC system without specific heat integration between the methanol and GCC plants.

U.S. Pat. No. 4,676,063 describes a methanol synthesis/GCC system with multiple parallel modules for operating flexibility. Heat from the acid gas removal system of the GCC plant is sent to the methanol plant to saturate the syngas feed stream with water before employing a water-gas shift to increase hydrogen in the feed stream to the methanol reactor. No heat from the methanol plant is used in the GCC system. U.S. Pat. Nos. 4,663,931 and 4,665,688 describe essentially the same system in which a portion of the methanol product provides feed for the production of acetic acid or vinyl acetate respectively. In both cases heat of reaction from the methanol plant is used to generate steam.

U.S. Pat. No. 4,631,915 describes essentially the same system as U.S. Pat. No. 4,676,063 with the addition of a molten iron bath gasifier integrated with a primary hydrogenating coal gasifier to produce syngas for a methanol plant. No specific methanol plant to GCC heat integration is specified in this patent. U.S. Pat. No. 4,608,818 describes essentially the same system as U.S. Pat. No. 4,676,063 without acid gas removal system heat integration to saturate the methanol plant feed stream; no specific methanol plant/GCC heat integration is specified. U.S. Pat. No. 4,590,760 describes essentially the same system as U.S. Pat. No. 4,676,063 with added cooler-saturator loops to cool the raw syngas stream from the main gasifier before entering the acid gas removal system and to saturate the syngas stream entering the methanol plant. There is no integration in which heat from the methanol plant is utilized in the main GCC system.

U.S. Pat. No. 4,277,416 describes a basic methanol plant with syngas feed from a coal gasifier or steam methane reformer with no specific heat integration. This patent also describes an operation in which some of the syngas is combined with effluent nitrogen from an air separation plant to provide feed to a urea plant.

U.S. Pat. No. 4,273,743 describes a chemical reaction system (preferably ammonia synthesis) providing heat to a semi-closed Brayton cycle power plant for the integrated production of power and chemical product. This patent specifically teaches methanol synthesis as well, but does not teach application to open Brayton cycle power generation of the type used in GCC plants.

UK Patent Application GB 2,075,124 describes an integrated GCC/methanol plant with methanol co-firing to enable fast startup and superior power load following capabilities. The production of steam in the methanol plant and use of this steam for power generation in a steam turbine is disclosed.

South African Patent Application 853,010 describes a system for the production of ammonia or methanol integrated with a coal or heavy oil gasification combined cycle power plant. In this system, the cooling of the syngas stream before sulfur removal is used to generate steam for increased power generation in the steam turbine section of the combined cycle plant. There is no heat integration between the ammonia or methanol plants and the power plant.

The capacity of the main air compressor of a gas turbine power plant can be increased by cooling the air feed to increase gas density and/or additionally humidifying the air to increase mass flow rate. This is usually accomplished by a separate compressor-driven heat pump refrigeration system which adds significant capital cost and draws substantial electric power from the overall plant. U.S. Pat. No. 4,424,667 describes the use of a heat pump powered by the gas turbine output to pre-cool the inlet air to the main gas turbine air compressor. U.S. Pat. Nos. 3,877,218 and 3,788,066 describe the use of a separate compressor driven refrigeration system to pre-cool the air fed to the main gas turbine compressor. U.S. Pat. No. 3,796,045 describes the use of a separate compressor drive refrigeration system and a supercharging inlet fan to pre-cool and pressurize the air to the main gas turbine compressor. These methods for precooling gas turbine air compressor feed typically require expensive, complicated equipment with significant power draw from the gas turbine system.

In the background art described above, heat from the reaction section of a combined GCC/chemical production system is utilized in the GCC system to generate steam for use in the steam turbine. Other uses of the reaction heat in the GCC system are not disclosed. Similarly, direct refrigeration of GCC streams is disclosed in the background art, but use of recovered refrigeration from a chemical production system integrated with a GCC system is not taught.

GCC systems have environmental advantages over traditional power plants which utilize liquid or solid carbonaceous fuels, and oxygen-derived synthesis gas is an attractive feedstock for the coproduction of chemical or liquid fuel products and electric power. New integrated GCC/chemical coproduction plants will be installed and operated in coming years because of favorable environmental and economic advantages, and methods to improve the efficiency and degree of integration of such plants are desirable. The invention disclosed in the following specification and defined in the appended claims offers methods for such improvements to GCC/chemical coproduction plants.

SUMMARY OF THE INVENTION

The coproduction of electric power and chemical or liquid fuel products from a synthesis gas feed containing hydrogen and carbon monoxide is known in the art, and the electric power typically is produced by a generator driven by a combustion turbine system. In the combustion turbine system, inlet air is compressed and combusted with fuel in a combustor to provide hot pressurized combustion gas which is expanded through an expansion turbine to drive the generator. At least a portion of the synthesis gas feed is reacted exothermically to produce the chemical or liquid fuel products, unreacted synthesis gas, and heat of reaction. The unreacted synthesis gas is combined with a second portion of the synthesis gas feed to provide at least a portion of the fuel for the combustor. The present invention is a method by which the efficiency of producing the power and chemical or liquid fuel products is improved by recovering at least a portion of the heat of reaction by indirect heat exchange with water to yield a stream of heated water, heating and humidifying the unreacted synthesis gas by direct contact with a first portion of the stream of heated water to yield heated humidified unreacted synthesis gas, and utilizing the heated humidified unreacted synthesis gas to provide at least a portion of the fuel for the combustor.

Further improvement is realized when supplemental fuel gas is used. The improvement comprises heating and humidifying the supplemental fuel gas by direct contact with a second portion of the stream of heated water to yield heated humidified supplemental fuel gas, and introducing the heated and humidified supplemental fuel gas into the combustor. The supplemental fuel gas typically is natural gas.

The synthesis gas feed is produced at a first pressure by the gasification of a carbonaceous feedstock using at least oxygen, wherein the oxygen is provided by compressing an air feed stream, cooling the resulting compressed air stream, and separating the cooled compressed air stream in a cryogenic air separation system to produce the oxygen. Optionally, a nitrogen byproduct is recovered in the cryogenic air separation system and is heated and humidified by direct contact with a second portion of the stream of heated water to yield a heated, humidified nitrogen stream. This nitrogen stream optionally is further heated and humidified by direct contact with water heated by the exhaust of the expansion turbine and heat from the gasification of the carbonaceous feedstock to yield a further heated, humidified, nitrogen stream, and introducing this stream into the combustor to generate additional hot gas for the expansion turbine.

In one embodiment, the portion of synthesis gas feed is reacted exothermically to produce methanol as the chemical product in a liquid phase reactor system comprising powdered methanol synthesis catalyst slurried in an inert liquid. In an alternative embodiment, the portion of synthesis gas feed is reacted exothermically to produce a mixture of methanol and dimethyl ether in a liquid phase reactor system comprising powdered methanol synthesis catalyst and powdered methanol dehydration catalyst slurried in an inert liquid. In another alternative embodiment, the portion of synthesis gas feed is reacted to produce a mixture of paraffinic hydrocarbons in a liquid phase reactor system comprising powdered hydrocarbon synthesis catalyst slurried in a hydrocarbon liquid.

In an optional embodiment, low level excess refrigeration is recovered from a low temperature sulfur removal system upstream of the reactor and/or from the expansion of cooled unreacted synthesis gas. This recovered refrigeration is used to chill water which in turn is used to cool the inlet air to the gas turbine air compressor and optionally the inlet air to the cryogenic air separation system main compressor.

The present invention thus recovers waste heat from the chemical reactor system and utilizes this heat to increase the efficiency of the gas turbine system. Waste refrigeration, recovered from a physical solvent-based sulfur removal system upstream of the chemical reactor system and optionally from expansion of pressurized unreacted synthesis gas, is used to improve the efficiency of the gas turbine and cryogenic air separation system by precooling the air compressor inlet streams. This use of waste heat and refrigeration effectively integrates the operation of the combined cycle and chemical reactor systems.

DETAILED DESCRIPTION OF THE INVENTION

Figure 1:
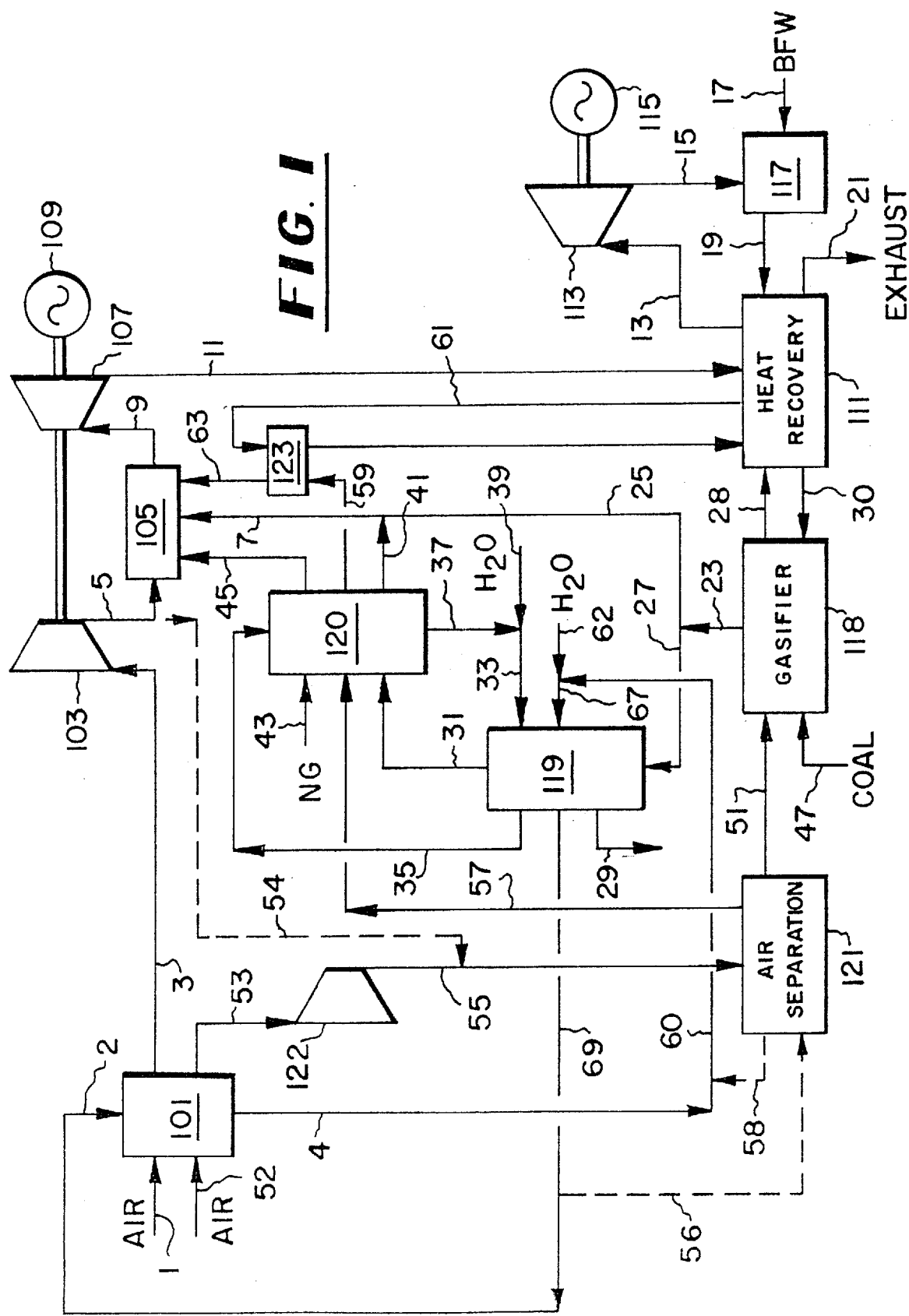
FIG. 1 is a process flow diagram of the process of the present invention.

A method for producing chemical or liquid fuel products and electric power from synthesis gas is illustrated in FIG. 1. Inlet air 3 is compressed in gas turbine compressor 103 typically to 100–500 psig. Compressed air 5 is combusted with fuel gas 7 in combustor 105 and the resulting hot pressurized gas 9, which is typically between 100 and 500 psig and 1500° to 2800° F., is expanded to 1–20 psig through hot gas expansion turbine 107. Shaft power from turbine 107 drives compressor 103 and electric power generator 109. Hot exhaust gas 11 at 800° to 1300° F. passes to heat recovery zone 111 to generate steam 13 at 50 to 3000 psig and 250° to 1200° F., and steam 13 is expanded through steam turbine 113 which drives electric power generator 115. Expanded steam 15 is condensed in condenser zone 117 and is supplemented with makeup boiler feedwater 17 to provide water feed 19 to heat recovery zone 111. Cooled combustion flue gas 21 is discharged to the atmosphere.

In one embodiment of the present invention, air 1 is cooled and humidified in direct contact cooling zone 101 by contact with chilled water 2 and the resulting cooled, humidified air provides inlet air 3 to compressor 103. This embodiment is an improvement to the combined cycle power generation system in which the cooling and humidification of air feed 1 increases the mass flow and decreases the density of compressor inlet air 3, thereby increasing the capacity of compressor 103 and the output of expansion turbine 107. The source of chilled water 2 for direct contact cooling zone 101 is a key embodiment of the invention as described in more detail below. Direct contact cooling zone 101 utilizes a mass transfer device for contacting air and chilled water; this device may be a packed tower, spray tower, or any other type of gas-liquid contacting device known in the art.

Fuel gas 7 preferably is generated by the gasification of a carbonaceous feed in gasifier 118 to provide a mixture 23 of hydrogen, carbon monoxide, carbon dioxide, and other minor components which is used to provide fuel 25 and synthesis gas feed 27. Gasifier 118 is thermally linked with heat recovery zone 111 by water/steam streams 28 and 30. Synthesis gas feed 27 is introduced into reaction zone 119 in which components in synthesis gas feed 27 are reacted exothermically to yield a final chemical or liquid fuel product 29, unreacted synthesis gas 31, and heat generated by the reaction. Cooling water 33 removes at least a portion of the heat of reaction generated in reaction zone 119 by indirect heat exchange to yield heated water stream 35 at about 200° to 500° F. Heated water stream 35 is introduced into direct contact heating zone 120, in which one or more gas streams are heated and humidified separately as described later, and a cooled water stream 37 is withdrawn therefrom. Makeup water 39 is combined with water stream 37 to provide cooling water 33. Reaction zone 119 optionally may include steps in which cold gas streams are warmed by indirect heat exchange with water feed 67 to yield chilled water stream 69 at 40° to 70° F. as described later.

In another embodiment of the invention, unreacted synthesis gas 31 is heated and humidified by heated water stream 35 in a direct contact mass transfer device within direct contact heating zone 120 to yield heated and humidified unreacted synthesis gas 41. This mass transfer device may be a packed tower, spray tower, or any other type of gas-liquid contacting device known in the art. Synthesis gas 25 and humidified unreacted synthesis gas 41 are combined to provide fuel 7 to gas turbine combustor 105. Optionally, supplemental fuel gas 43 may be required to compensate for the heating value of synthesis gas feed 27. Supplemental fuel gas 43, preferably natural gas, is similarly heated and humidified by heated water stream 35 in direct contact heating zone 120 to yield heated and humidified fuel gas 45 in a direct contact device (not separately shown) which is fired in gas turbine combustor 105. The heating and humidification of fuel gas streams 41 and 45 utilizes heat of reaction from reaction zone 119 to increase the temperature and mass flow of fuel to combustor 105, thereby increasing the output of expansion turbine 107. This humidification also reduces the generation of nitrogen oxides (NOx) by reducing the adiabatic flame temperature in combustor 105.

In an optional embodiment of the invention, the entire synthesis gas stream 23 from gasifier 118 is utilized as synthesis gas feed 27 to reaction zone 119, and there is no additional synthesis gas 25 utilized as fuel. Alternatively, a portion of unreacted synthesis gas 31 can be recycled to reaction zone 119 to increase the overall conversion of synthesis gas to chemical or liquid fuel product 29.

Gasifier 118 is any type of gasifier known in the art for gasifying carbonaceous material. In one mode of operation, coal 47 is gasified with steam 30 and oxygen 51 in a commercially-available gasifier based on gasifier technology provided for example by Shell, Texaco, Lurgi, Destec, or other gasifier technology owners. Alternatively, hydrocarbon-water emulsions, petroleum coke, vacuum oil residuum or other liquid hydrocarbon, or solid carbonaceous waste can be used in place of coal 47. Alternatively, gasifier 118 can be a partial oxidation unit which operates on gaseous, liquid, or solid hydrocarbons selected from natural gas, petroleum coke, vacuum oil residuum or other liquid hydrocarbon, and solid carbonaceous waste. Oxygen 51 for gasifier 118 is provided by cryogenic air separation system 121 of any type known in the art in which air 53 is compressed typically to at least 50 psig by compressor 122 to yield compressed air feed 55, which is cooled, separated cryogenically, and repressurized to provide oxygen 51 at up to 1,500 psig and nitrogen byproduct 57 at between about 100 and 400 psig. Optionally, feed air 52 is precooled and humidified by direct contact with chilled water 2 in a direct contact cooler (not separately shown) in direct contact cooling zone 101, which increases the density of compressor inlet air 53, thereby increasing the capacity of compressor 122. Alternatively, compressed air feed 55 to cryogenic air separation system 121 can be supplemented with additional compressed air 54 from compressor 103. Optionally, the operation of cryogenic air separation system 121 can be enhanced by using chilled water stream 56 to cool compressed air 55 in a direct contact aftercooler (not separately shown) in cryogenic air separation system 121. Warmed water streams 4 and/or 58 are returned as stream 60 which is combined with makeup water 62 to provide water feed 67 which is chilled in reaction zone 119 as described below to provide chilled water 69.

In an alternative embodiment of the invention, pressurized nitrogen byproduct 57 is heated and humidified in a direct contact heater (not separately shown) in direct contact heating zone 120 to yield heated and humidified pressurized nitrogen 59 which is further heated and humidified in zone 123 by direct contact with hot water 61 from heat recovery zone 111. Hot, humidified nitrogen 63 is introduced into combustor 105 to yield two benefits: (1) the temperature and mass flow of gas to combustor 105 is increased, thereby increasing the output of expansion turbine 107; and (2) the flame temperature in combustor 105 is decreased, thereby reducing the generation of nitrogen oxides in flue gas 21. Further NOx control can be achieved by the direct injection (not shown) of boiler feed water or steam into combustor 105, or by humidification of fuel gas 43.

Figure 2:
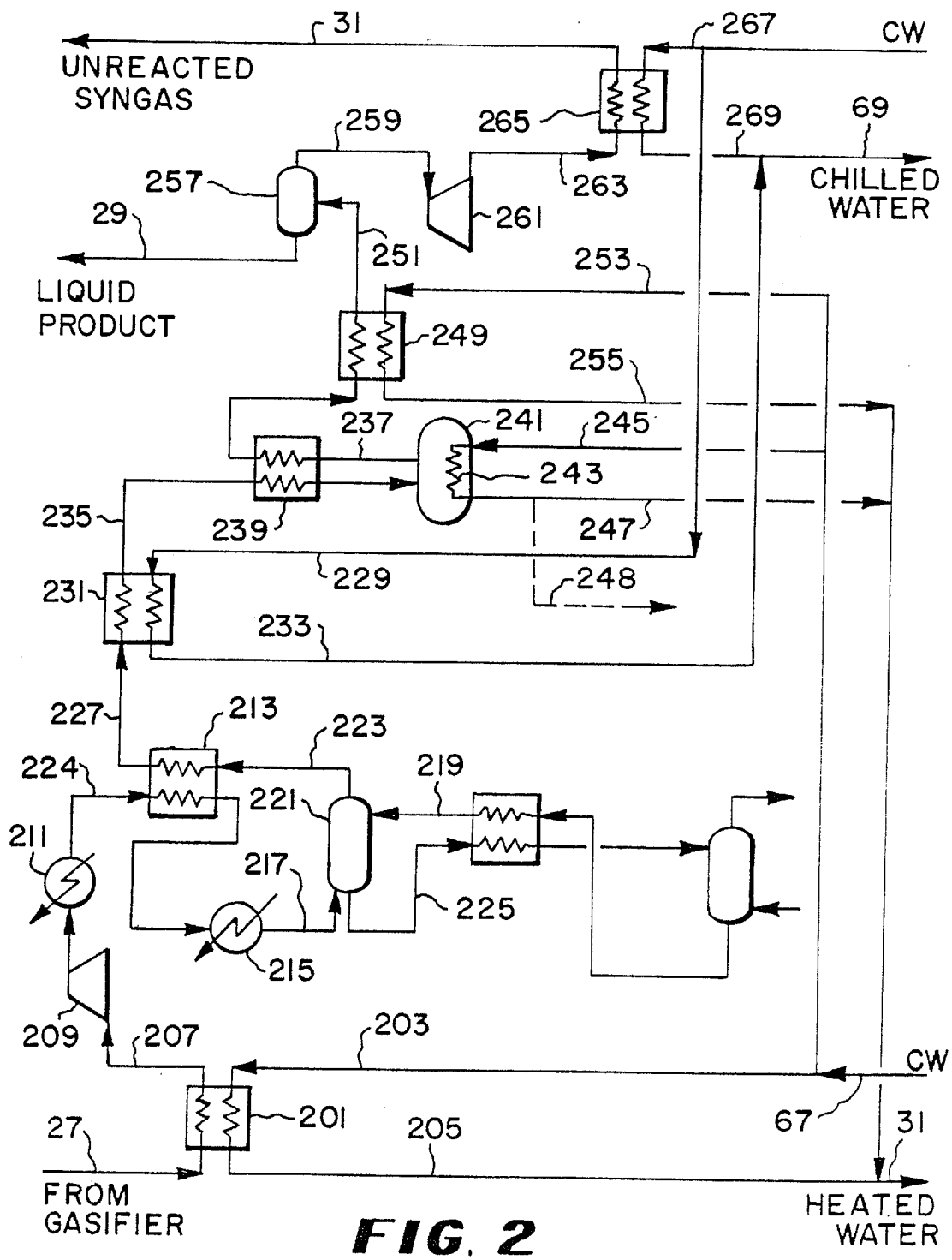
FIG. 2 is a process flow diagram of a chemical reaction system utilized in the present invention.

A preferred embodiment of reaction zone 119 is described in more detail in FIG. 2. Synthesis gas 27, typically at 100° to 500° F. and 100 to 1200 psig, may contain residual sulfur compounds such as hydrogen sulfide or mercaptans which were not removed in the gas cleanup system of gasifier 118. Since sulfur may be harmful to catalysts used in promoting the reaction of synthesis gas 27 to yield liquid product 29, a deep sulfur removal step often is required. Synthesis gas 27 first is cooled to 80°–200° F. in cooling exchanger 201 by indirect heat exchange with cooling water 203 to yield hot water 205 and cooled synthesis gas 207. Cooled synthesis gas 207 is compressed in compressor 209 to 1000–1500 psig and cooled in cooler 211, heat exchanger 213, and refrigeration exchanger 215 typically to between about −40° and +40° F. Cold synthesis gas 217 is then contacted with cold, pressurized solvent 219 such as methanol or other physical solvents known in the art which absorbs substantially all of the residual sulfur compounds to yield cold desulfurized synthesis gas 223. Sulfur-containing solvent 225 is then regenerated to remove dissolved sulfur compounds as is known in the art, yielding pressurized solvent 219. Cold desulfurized synthesis gas 223 is warmed against compressed synthesis gas 224 to yield desulfurized synthesis gas 227 at about 30° to 100° F. Synthesis gas 227 is further warmed by indirect heat exchange with ambient cooling water 229 in exchanger 231 to yield chilled water stream 233 and warmed synthesis gas 235 at about 50° to 150° F.

Warmed synthesis gas 235 is heated against reactor effluent vapor 237 in heat exchanger 239, is further heated if necessary (not shown), and passes into reactor 241 where the synthesis gas components comprising hydrogen and carbon oxides react exothermically to produce reactor effluent vapor 237 comprising one or more synthesized chemical products and unreacted synthesis gas components. Any known reaction or reactions in which the synthesis gas components react exothermically to form desired chemical or liquid fuel products can be employed in reactor 241 of the present invention. A preferred reaction and reactor type is the synthesis of methanol in a liquid phase reactor containing powdered methanol synthesis catalyst slurried in an inert liquid as is known in the art, disclosed for example in U.S. Pat. Nos. 4,639,470 and 4,946,477 which are incorporated herein by reference. Another preferred reaction and reactor type is the synthesis of methanol and dimethyl ether in a liquid phase reactor containing powdered methanol synthesis catalyst and methanol dehydration catalyst slurried in an inert liquid as is known in the art, disclosed for example in U.S. Pat. No. 5,218,003 which is incorporated herein by reference. Alternatively, reactor 241 can be charged with a hydrocarbon synthesis catalyst, e.g. a Fischer-Tropsch catalyst slurried in a hydrocarbon liquid, wherein synthesis gas is converted into a mixture of chiefly paraffinic hydrocarbons used for the production of fuel products as is known in the art. Optionally, reactor 241 can be a packed bed reactor in which the synthesis gas contacts the solid catalyst to yield a chemical or fuel product.

Reactor 241 is preferably of the slurry type wherein synthesis gas reacts in a three-phase reactor in which the slurry absorbs the heat of reaction, and this heat is removed readily by placing cooling exchanger 243 within reactor 241. Cooling water 245 passes through exchanger 243 and is heated to 250°–500° F. to yield heated water stream 247. Alternatively, the flow rate of cooling water 245 can be controlled such that complete vaporization occurs in exchanger 243 to produce steam 248 which is sent to heat recovery zone 111 to increase the steam rate to steam turbine 113, which generates additional power by generator 115. Reactor effluent 237 is cooled in exchanger 239 and is cooled further in condenser 249 to yield vapor-liquid stream 251. Cooling for condenser 249 is provided by cooling water 253 which is warmed to yield heated water 255. Heated water streams 205, 247, and 255 are combined to yield heated water stream 35 of FIG. 1. This stream is typically in the temperature range of 250° to 500° F.

Vapor-liquid stream 251 is separated in vessel 257 to yield liquid product 29 and pressurized unreacted synthesis gas 259 which is expanded through turboexpander 261 to a pressure about equal to that of synthesis gas 25 from gasifier 118 (FIG. 1). Expansion cools the unreacted synthesis gas to about 0°–200° F.; cooled stream 263 is warmed in exchanger 265 against ambient cooling water 267 to yield chilled water 269 and unreacted synthesis gas 31. Chilled water streams 233 and 269 are combined to yield chilled water 69 of FIG. 1.

Figure 3:
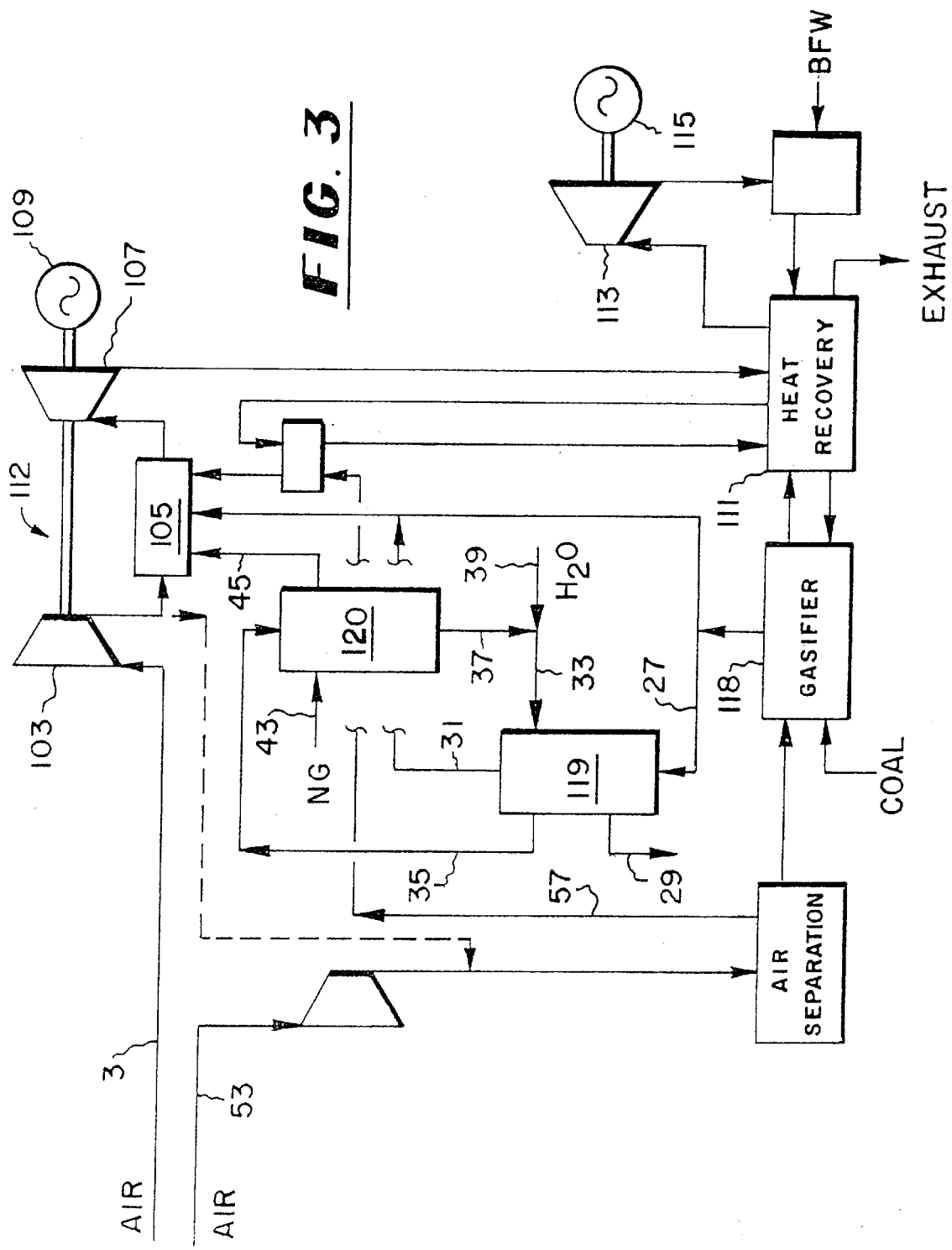
FIG. 3 is a process flow diagram for a specific example of the present invention.

An alternative operating mode of the invention is given in FIG. 3, which is a simplified version of the invention as described in FIG. 1. In the alternative mode of FIG. 3, low level heat is recovered from chemical reaction zone 119 by heated water stream 35 which heats and saturates supplemental fuel 43 in direct contact heater 120. Heated and saturated gas stream 45 is combusted in gas turbine combustor 105. Unreacted synthesis gas 31 and nitrogen byproduct 57 are not heated in direct contact heater 120. There is no recovery of low level refrigeration as earlier described in the embodiment of FIG. 1. Compressor inlet and streams 3 and 53 are not precooled as in the previous embodiment.

Figure 4:
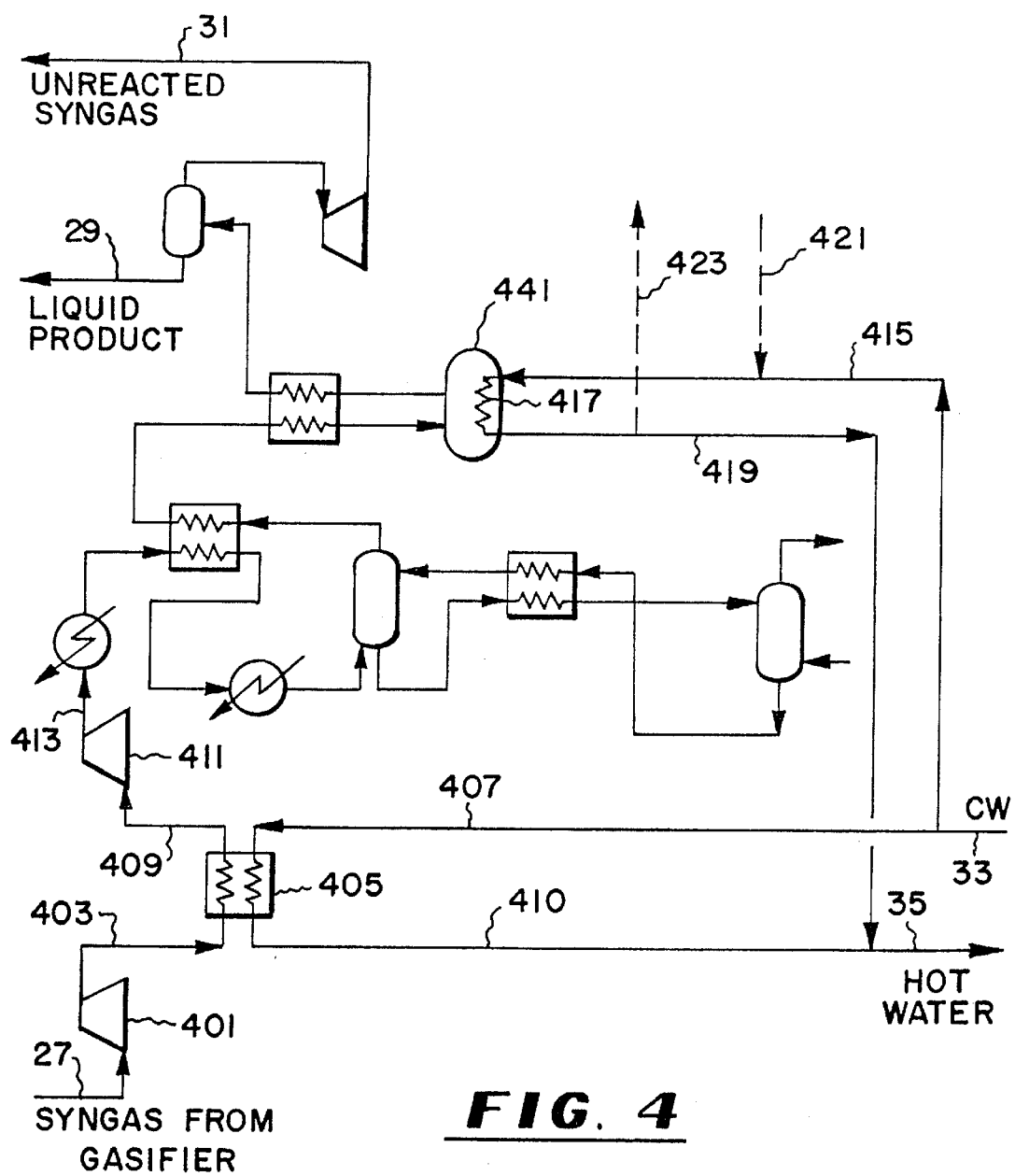
FIG. 4 is a process flow diagram of the chemical reaction system utilized in the example of FIG. 3.

Reaction zone 119 for this embodiment is described in more detail in FIG. 4. Synthesis gas 27, which in this embodiment is delivered at 100° to 300° F. and 200 to 400 psig, is compressed in first stage compressor 401. Hot compressed syngas 403 at 300–1000 psig and 200°–500° F. is cooled in intercooler 405 against cooling water 407 to yield second stage inlet gas 409, which is further compressed in second compressor stage 411. Heated water stream 410 which carries waste heat from intercooler 405 is used via stream 35 to heat and humidify supplemental fuel 43 in direct contact heater 120 of FIG. 3. Compressed syngas 413 is desulfurized and heated in the same manner as earlier described and passes to reactor 441. Liquid product 29 and unreacted synthesis gas 31 correspond to the same streams in FIG. 3. Cooling water 415 passes through internal cooling coil 417 to remove heat of reaction from reactor 441 as heated water stream 419, which is combined with heated water stream 409 to yield heated water 35. Alternatively, boiler feedwater 421 is introduced such that complete vaporization occurs in exchanger 417 to produce steam 423 which is sent to heat recovery zone 111 of FIG. 3 to increase the steam rate to steam turbine 113, which in turn generates additional power by generator 115. In this case, heated water stream 35 is supplied entirely by heated water stream 410 from intercooler 405.

The utilization of waste heat from intercooler 405 via stream 35 eliminates the need for plant cooling water normally used for compressor intercooling. Stream 35 carries intercooler waste heat to direct contact heater 120 of FIG. 3 and cooled water 33 (including makeup 39) is returned therefrom to complete a closed cycle recirculating water system. The use of waste heat from intercooler 405 in direct contact heater 120 is preferred over the usual rejection of this heat in the plant cooling water system. The waste heat therefore is utilized beneficially in the process and the plant cooling water requirement is reduced.

Thus the key feature of the present invention is that heat of reaction in reactor system 119 is recovered as hot water which is used to heat and humidify one or more gas streams introduced into combustor 105 as shown in FIG. 1. In addition, cold process streams in reactor system 119 are warmed to chill water which is used in turn to cool one or more compressor inlet streams as shown in FIG. 1. The advantage of the present invention is that the recovery of low level waste heat and refrigeration from reactor system 119 improves the overall operating efficiency of the gasification combined cycle system. Thus the operation of the combined cycle and chemical reactor systems are thermally integrated in an effective manner.

EXAMPLE 1

The process of the present invention as embodied in FIGS. 3 and 4 was modeled using commercially-available computer process simulation packages for different process options. The ambient conditions for feed air streams 3 and 53 are 59° F. and 60% relative humidity. The process basis is a nominal 300 MW of gross power produced by General Electric 7FA gas turbine system 112, steam turbine 113/ generator 115, and Shell coal gasification system 118. The chemical reactor system 119 is a liquid phase methanol reaction system. Supplemental fuel to compensate for the heating value of synthesis gas 27 is provided by natural gas 43. NOx control in combustor 105 is provided by direct water or steam injection (not shown) to combustor 105. In addition, heat from reactor 441 of FIG. 4 is removed via exchanger 417 by generating steam 423 which is sent to heat recovery zone 111 to increase the steam rate to turbine 113 thereby increasing power generation.

A base case (Case 1) was simulated in which natural gas 43 is fired directly to combustor 105 without preheating and humidification. The system of FIG. 3 then was simulated (Case 2) with preheating and humidification of natural gas 43° to 244° F. in direct contact heater 120 using heated water 35 from reactor 441. The results indicated a fuel saving in Case 2 over the base case equivalent to 3.0 MMBTU/hr and a plant cooling water reduction of 591 gpm.

EXAMPLE 2

The simulation of Example 1 was repeated except that steam from heat recovery zone 111 is introduced into combustor 105 for NOx control (not shown) rather than liquid water. This revised base case was designated as Case 3. The system then was simulated (Case 4) using the embodiment of preheating and humidifying natural gas 43° to 244° F. in direct contact heater 120 using heated water 35 from reactor 441. The results indicated that Case 4 required 2.0 MMBTU/hr less fuel and generated 112 kW more power than Case 3. In addition, a cooling water reduction of 591 gpm was realized in Case 4 over Case 3.

Another simulation was carried out (Case 5) as a modification to Case 4 in which waste heat from reactor 441 (FIG. 4) is recovered as heated water 419 which is combined with heated water 410 from intercooler 450 to yield heated water 35. Heated water 35 is used to heat and saturate supplemental fuel 43° to 386° F. prior to firing as stream 45 to combustor 105 (FIG. 3). The degree of saturation of supplemental fuel 45 is such that no additional steam to combustor 105 is required for NOx control. The results indicated that Case 5 required 1.9 MMBTU/hr less fuel and generated 966 kW more power than Case 3. In addition, a cooling water reduction of 327 gpm was realized in Case 5 compared with Case 3.

These examples illustrate the benefits of the present invention in utilizing the waste heat and waste refrigeration from the chemical reaction system to improve the operation of the gasification combined cycle system. The invention effectively integrates the gasification combined cycle and chemical reaction systems and renders the overall operation of the combined systems more efficient than individual operation of each system.

The embodiment in which chilled water cools the inlet air to the compressors for the gas turbine and cryogenic air separation systems is superior to the common practice of using separate refrigeration systems for such cooling. Heating and saturating the fuel and pressurized nitrogen streams to the gas turbine combustor increases the mass flow of gas to the expansion turbine and decreases the requirement for saturation heat from the combined cycle heat recovery system. The net effect of these steps is an increase in available motive energy in the gas streams to the steam and combustion turbines, which in turn increases power output as illustrated by the Examples.

The essential characteristics of the present invention are described completely in the foregoing disclosure. One skilled in the art can understand the invention and make various modifications thereto without departing from the basic spirit thereof, and without departing from the scope of the claims which follow.

We claim:

1. In the coproduction of electric power and one or more chemical or liquid fuel products from a synthesis gas feed containing hydrogen and carbon monoxide, wherein said electric power is produced by a generator driven by a combustion turbine system in which inlet air is compressed and combusted with fuel in a combustor to provide hot pressurized combustion gas which is expanded through an expansion turbine to drive said generator, wherein at least a portion of said synthesis gas feed is reacted exothermically to produce said chemical or liquid fuel products, unreacted synthesis gas, and heat of reaction, and wherein said unreacted synthesis gas provides at least a portion of said fuel for said combustor, the efficiency of producing said power and chemical or liquid fuel products is improved by a method which comprises recovering at least a portion of said heat of reaction by indirect heat exchange with water to yield a stream of heated water, heating and humidifying said unreacted synthesis gas by direct contact with a first portion of said stream of heated water to yield heated humidified unreacted synthesis gas, and utilizing said heated humidified unreacted synthesis gas to provide at least a portion of said fuel for said combustor.

2. The method of claim 1 which further comprises heating and humidifying a supplemental fuel gas by direct contact with a second portion of said stream of heated water to yield heated humidified supplemental fuel gas, and introducing said heated humidified supplemental fuel gas into said combustor.

3. The method of claim 2 wherein said supplemental fuel gas is natural gas.

4. The method of claim 1 wherein said synthesis gas feed is produced at a first pressure by the gasification of a carbonaceous feedstock using at least oxygen, and wherein said oxygen is provided by compressing an air feed stream, cooling the resulting compressed air stream, and separating the resulting cooled compressed air stream in a cryogenic air separation system to produce said oxygen.

5. The method of claim 4 wherein said carbonaceous feedstock is selected from the group consisting of coal, petroleum coke, vacuum oil residuum, hydrocarbon-water emulsions, solid carbonaceous waste, and liquid hydrocarbons, and wherein said carbonaceous feedstock is gasified using oxygen.

6. The method of claim 4 wherein said carbonaceous feedstock is a gaseous hydrocarbon which is converted to said synthesis gas feed by partial oxidation using oxygen.

7. The method of claim 4 which further comprises recovering a nitrogen byproduct in said cryogenic air separation system, heating and humidifying said nitrogen byproduct by direct contact with a second portion of said stream of heated water to yield a heated, humidified, nitrogen stream.

8. The method of claim 7 which further comprises the additional heating and humidification of said heated, humidified, nitrogen stream by direct contact with water heated by the exhaust of said expansion turbine and heat from said gasification of said carbonaceous feedstock to yield a further heated, humidified, nitrogen stream, and introducing said stream into said combustor.

9. The method of claim 4 wherein said portion of the synthesis gas feed is reacted exothermically to produce said chemical or liquid fuel products, unreacted synthesis gas, and said stream of heated water by the steps which comprise:

(a) cooling said portion of the synthesis gas feed by indirect contact with cooling water to yield cooled synthesis gas and a first hot water stream;

(b) compressing said cooled synthesis gas;

(c) heating the resulting compressed synthesis gas feed and reacting the synthesis gas in a catalytic reactor system exothermically at a superambient temperature to yield a hot reactor effluent comprising unreacted synthesis gas and at least one of said chemical or liquid fuel products;

(d) cooling said catalytic reactor system by indirect contact with cooling water to yield a liquid chemical product, a stream of pressurized unreacted synthesis gas, and said stream of heated water;

(e) expanding said stream of pressurized unreacted synthesis gas to said first pressure across an expansion valve or through an expansion turbine to yield cooled unreacted synthesis gas; and (f) warming said cooled unreacted synthesis gas by indirect heat exchange with ambient temperature water to yield a first chilled water stream and said unreacted synthesis gas for use as fuel in said combustor.

10. The method of claim 9 which further comprises combining said first hot water stream with said stream of heated water.

11. The method of claim 9 which further comprises:

(g) cooling said compressed synthesis gas feed to a subambient temperature and removing sulfur compounds therefrom by contacting with a physical solvent to yield a cold, reduced-sulfur synthesis gas; and (h) warming said cold, reduced-sulfur synthesis gas by indirect heat exchange with ambient temperature water to yield a second chilled water stream and a warmed synthesis gas feed which is further heated in step (c).

12. The method of claim 11 which further comprises combining said first and second chilled water streams and contacting at least a portion of the resulting combined stream with said combustion turbine system inlet air in a direct contact cooler to provide cooled air to the compressor of said combustion turbine system.

13. The method of claim 11 which further comprises combining said first and second chilled water stream and contacting at least a portion of the resulting combined chilled water stream with said air feed stream in a direct contact cooler to provide cooled air to the compressor of said cryogenic air separation system.

14. The method of claim 13 which further comprises cooling compressed air from the compressor of said cryogenic air separation system in a direct contact aftercooler with another portion of said resulting combined chilled water stream.

15. The method of claim 9 wherein said first portion of the synthesis gas feed is reacted exothermically to produce methanol in a liquid phase reactor system comprising powdered methanol synthesis catalyst slurried in an inert liquid.

16. The method of claim 9 wherein said first portion of the synthesis gas feed is reacted exothermically to produce a mixture of methanol and dimethyl ether in a liquid phase reactor system comprising powdered methanol synthesis catalyst and powdered methanol dehydration catalyst slurried in an inert liquid.

17. The method of claim 9 wherein said first portion of the synthesis gas feed is reacted exothermically to yield a product comprising paraffinic hydrocarbons in a liquid phase reactor system comprising powdered hydrocarbon synthesis catalyst slurried in a hydrocarbon liquid.

* * * * *